June 20, 1939.   J. J. MASSALSKI   2,163,098
SUPPORT DEVICE
Filed Nov. 25, 1938   2 Sheets-Sheet 1
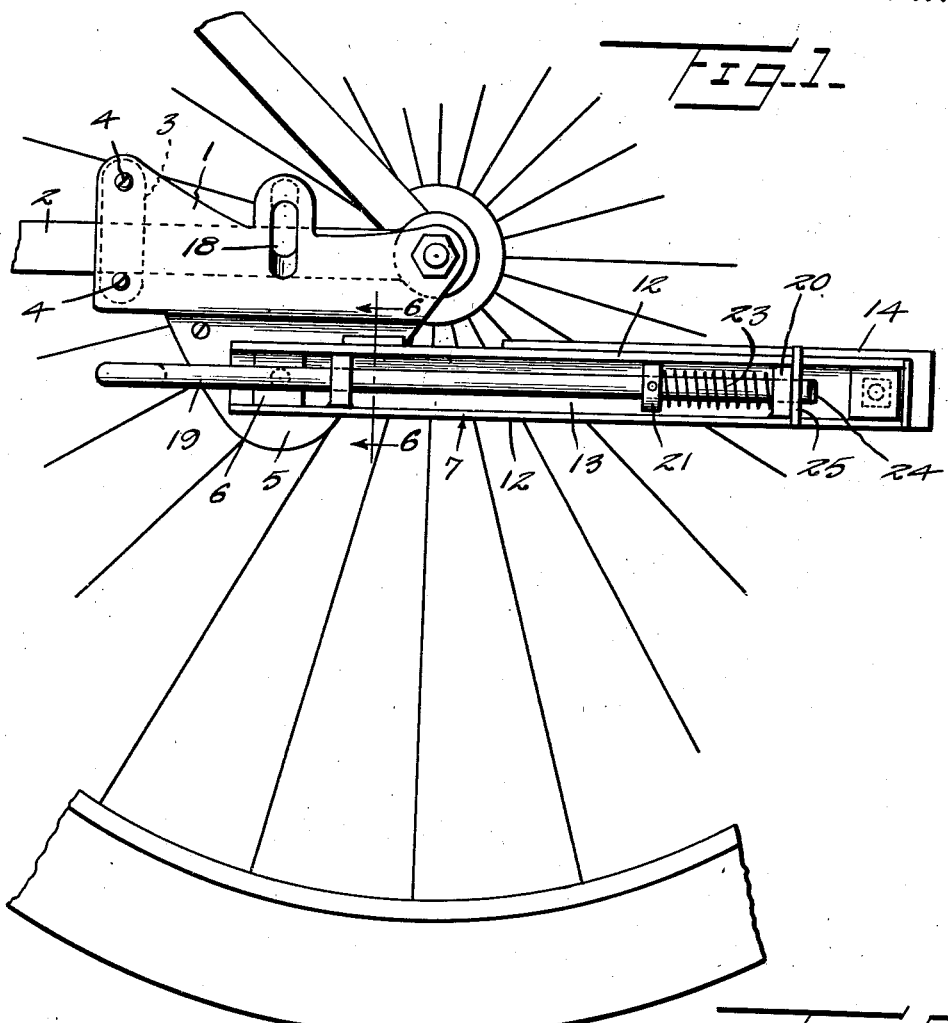
Joseph J. Massalski
INVENTOR
BY Victor J. Evans & Co.
ATTORNEYS

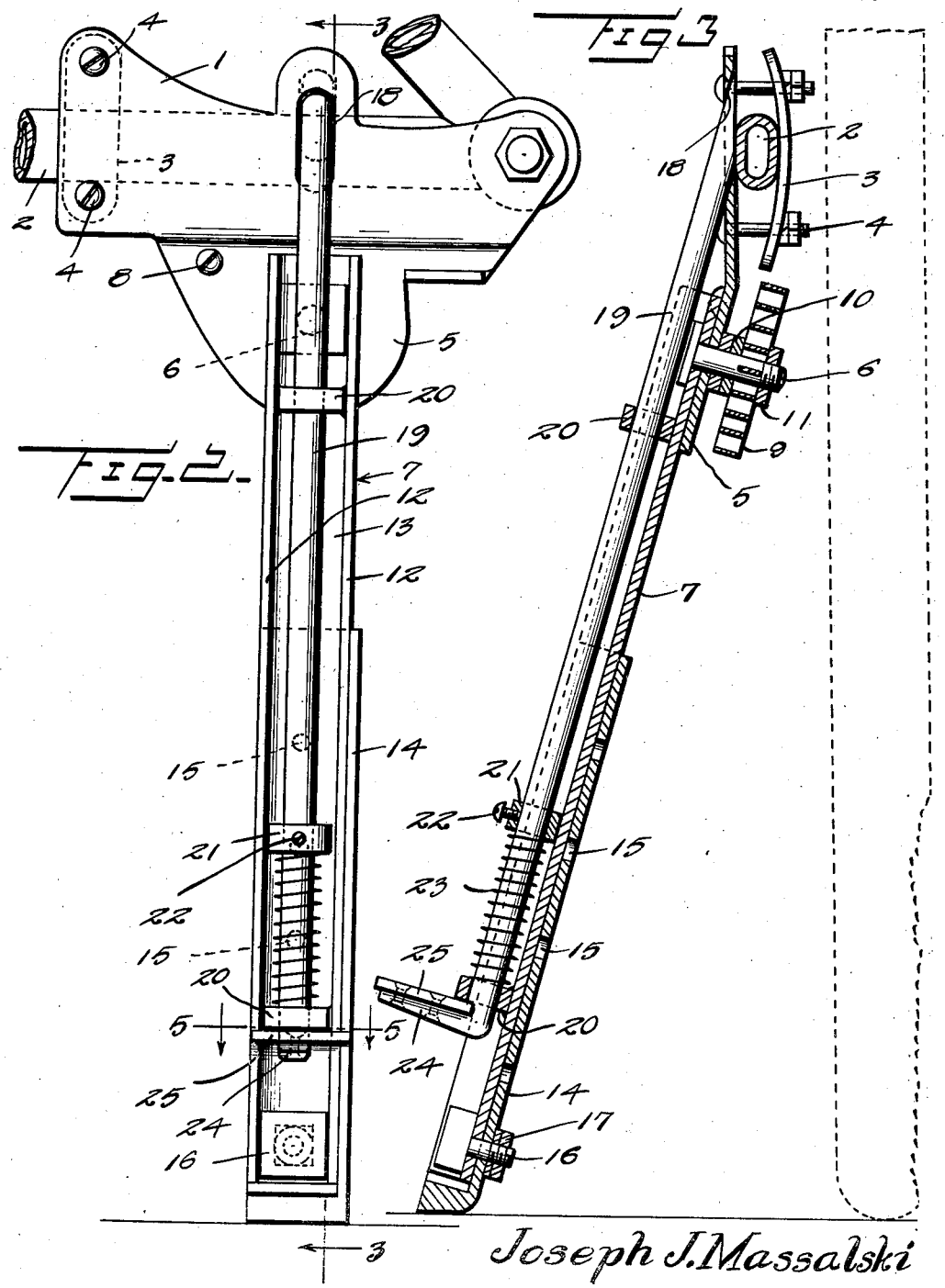

Patented June 20, 1939

2,163,098

UNITED STATES PATENT OFFICE 2,163,098

SUPPORT DEVICE

Joseph J. Massalski, Clinton, Mass.

Application November 25, 1938, Serial No. 242,377

4 Claims. (Cl. 280—298)

My invention relates to support devices for bicycles or the like and of a type which may be permanently secured thereto.

One of the principal objects of my invention is to provide a support device which may be permanently secured to a bicycle or the like and which comprises a supporting member or arm adapted to be moved either into supporting position or raised so as not to interfere with the operation of the bicycle.

Another object of my invention is to provide a device of the character described equipped with means for locking the supporting member or arm in supporting position to preclude accidental displacement thereof.

A further object of my invention is to provide a device of the character described wherein the supporting member or device is equipped with means for automatically operating the latter to raised position upon release of the locking means.

An important object of my invention is to provide a device of the character described capable of being attached to bicycles and the like already in use without modifying the same.

Another important object of my invention is to provide a device of the character described which is simple in construction, durable in use, efficient in operation and economical in manufacture.

Other objects and advantages will be apparent from the following description, appended claims and annexed drawings.

Referring to the drawings wherein like reference characters designate like parts throughout the several views:

Figure 1 is a side elevation of my invention, illustrating the same in raised position and connected to the rear portion of a frame of a bicycle.

Figure 2 is a view similar to Figure 1, but illustrating my device in lowered or supporting position for maintaining the bicycle in an upright position.

Figure 3 is a sectional view taken on the line 3—3 of Figure 2.

Figure 4 is a rear elevation of the bracket and which serves to secure the device to the rear section of the horizontal frame member.

Figure 5 is a detail sectional view taken on the line 5—5 of Figure 2.

Figure 6 is a detail sectional view taken on the line 6—6 of Figure 1.

My novel form of support device comprises a plate or bracket 1 which is adapted to be secured to the rear section of the horizontal frame member 2 of a bicycle or the like. One end of the plate is secured to the member 2 by means of a clamping plate 3 and bolts and nuts 4 and the opposite end by means of the wheel axle and nut of the latter, as clearly illustrated in Figures 1 to 3 inclusive of the drawings.

The lower front edge of the plate 1 is bent outwardly to form a mounting 5 through which extends a shaft 6 having fixed thereto the upper end of a support member or arm 7. The rear face of the mounting 5 has fixed thereto, by means of a pin 8, one end of a coil spring 9, the opposite or inner end of which is connected to the rearwardly extending end of the shaft 6 whereby movement of the member 7, from the raised position illustrated in Figure 1 to the lowered or supporting position illustrated in Figures 2 and 3, serves to tension the spring 9 for a purpose hereinafter set forth.

Mounted on the shaft 6 and interposed between the mounting 5 and spring 8 are spacers 10 to maintain the spring in spaced relation relative to the mounting. The end of the shaft 6 is threaded and accommodates thereon a nut 11 whereby to maintain the parts in assembled condition. The member 7 is of a channeled configuration and provided with spaced side and rear walls 12 and 13 respectively.

The lower end section of the member 7 has slidably secured thereto an extension 14, the latter provided with a rear face abutting the rear wall 13 and a side face abutting one of the side walls 12. The extension 14 is formed with a plurality of adjustment openings 15, one of which receives therethrough the shank of a bolt 16 extending through an aperture in the lower end of the member 7. The bolt 16 has secured thereto a nut 17 whereby to maintain the extension 14 fixed to the member 7. Obviously, by adjusting the bolt 16 in a selected opening 15, the length of the member 7 relative to the ground may be increased or shortened as desired. The head of the bolt 16 is of a square configuration to seat between the walls 12 and engage the latter to preclude relative movement of the bolt when the nut 17 is being adjusted thereon.

Intermediate the ends thereof, the bracket 1 is fashioned with a downwardly and outwardly inclined slot 18 which receives therein the upper end of a latch rod 19. The latch rod is slidably mounted in a pair of bearings 20 integrally fashioned between the walls 12 of the member 7 and adjacent the upper and lower ends of the latter. Adjustably mounted on the lower end of the latch rod 19, above the lower bearing 20, is a collar 21 having adjusted therein a set screw 22 whereby to effect adjustment of the collar relative to the rod 19.

Mounted in the lower end of the rod 19 and interposed between the lower bearing 20 and said collar 21, is a coil spring 23 normally urging said rod in an upward direction. The lower end of the rod, subjacent the lower bearing 20, is fashioned with a laterally and outwardly disposed section 24 on which is riveted a foot piece 25.

In operation, the device being in the position illustrated in Figure 1, the member 7 is pivoted downwardly by the operator's foot or hand and the rod slightly moved towards the lower end of the member 7 to enable the upper end of the rod 19 to effect registry with the slot 18 and be projected therein upon release of the rod 19 through the medium of the spring 23. In this position, as illustrated in Figures 2 and 3 of the drawings, the member 7 will be secured in locked relation with the bracket 1 and adequately support the bicycle in an upright position. Depression of the rod 19, through the medium of the foot piece 25, serves to retract the upper end of said rod from within the slot 18 and permits said member 7 to be automatically actuated to the raised position through the medium of the spring 9 as heretofore set forth.

From the foregoing it will be apparent that I have provided a simple and efficient supporting device capable of being attached to bicycles and the like whereby to support the same in an upright position when desired.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation which are capable of extended application in advance forms, and that the invention comprehends all construction within the scope of the appended claims.

What I claim is:

1. A device of the character described, comprising, a plate adapted to be secured to the frame of a bicycle and fashioned with an inclined slot adjacent its upper edge and with an outwardly and downwardly inclined lower section, an arm pivoted to said lower section and operable to raised and lowered positions relative to the frame, a spring fixed to said lower section and connecting said arm to said plate and operable for moving said arm from lowered to raised position, and a spring pressed latch rod slidably mounted on said arm and extending into said slot to maintain said arm in lowered position against the tension of said spring whereby to support said bicycle in an upright position, said rod movable from within said slot whereby to effect automatic raising of said arm by said spring.

2. A device of the character described, comprising, a plate adapted to be secured to the frame of a bicycle and fashioned with an inclined slot adjacent its upper edge and with an outwardly and downwardly inclined lower section, an arm pivoted to said lower section and operable to raised and lowered positions relative to the frame, a spring fixed to said lower section and connecting said arm to said plate and operable for moving said arm from lowered to raised position, a spring pressed latch rod slidably mounted on said arm and extending into said slot to maintain said arm in lowered position against the tension of said spring whereby to support said bicycle in an upright position, said rod removable from within said slot whereby to effect automatic raising of said arm by said spring, and an extension carried on the lower face of said arm and adjustable relative thereto for engagement with the ground.

3. A device of the character described, comprising, a plate adapted to be secured to a frame of a bicycle and fashioned with an inclined slot adjacent its upper edge and with an outwardly and downwardly inclined lower section having an angularly disposed portion extending outwardly therefrom, an arm pivoted to said section and operable to raised and lowered positions relative to the frame, a spring connected to said section and arm and operable for moving the latter from lowered to raised position, a spring pressed latch rod slidably mounted on said arm and having an upper end detachably seated within said slot for maintaining said arm in lowered position against the tension of said spring whereby to support said bicycle in an upright position, said latch rod operable to release said end from said slot whereby said arm is automatically actuated to raised position by said spring and maintained by the latter against said portion.

4. A device of the character described, comprising, a plate adapted to be secured to a frame of a bicycle and fashioned with an inclined slot adjacent its upper edge and with an outwardly and downwardly inclined lower section having an angularly disposed portion extending outwardly therefrom, an arm pivoted to said section and operable to raised and lowered positions relative to the frame, a spring connected to said section and arm and operable for moving the latter from lowered to raised position, a spring pressed latch rod slidably mounted on said arm and having an upper end detachably seated within said slot for maintaining said arm in lowered position against the tension of said spring whereby to support said bicycle in an upright position, said latch rod operable to release said end from said slot whereby said arm is automatically actuated to raised position by said spring and maintained by the latter against said portion, and an extension carried on the lower face of said arm and adjustable relative thereto for engagement with the ground.

JOSEPH J. MASSALSKI.